(12) United States Patent
Bissonnette et al.

(10) Patent No.: US 7,818,916 B2
(45) Date of Patent: Oct. 26, 2010

(54) PH BUFFERED PLANT NUTRIENT COMPOSITIONS AND METHODS FOR GROWING PLANTS

(75) Inventors: W. Michael Bissonnette, Boulder, CO (US); Laura L. Conley, Boulder, CO (US); Sylvia Bernstein, Boulder, CO (US); Susannah Ferguson, Lafayette, CO (US); John Thompson, Boulder, CO (US)

(73) Assignee: AeroGrow International, Inc., Boulder, CO (US)

( * ) Notice: Subject to any disclaimer, the term of this patent is extended or adjusted under 35 U.S.C. 154(b) by 782 days.

(21) Appl. No.: 11/321,023

(22) Filed: Dec. 28, 2005

(65) Prior Publication Data

US 2006/0254332 A1   Nov. 16, 2006

Related U.S. Application Data

(60) Provisional application No. 60/640,722, filed on Dec. 30, 2004.

(51) Int. Cl.
*A01G 31/00* (2006.01)
*C05B 7/00* (2006.01)

(52) U.S. Cl. .................. 47/59; 47/62 N; 71/34
(58) Field of Classification Search ............... 71/31–37; 42/62 N; 47/59, 62 R, 62 N
See application file for complete search history.

(56) References Cited

U.S. PATENT DOCUMENTS

| | | | | |
|---|---|---|---|---|
| 3,578,431 A | * | 5/1971 | Ingestad et al. .................. 71/1 |
| 3,649,239 A | * | 3/1972 | Mitchell ......................... 71/23 |
| 4,178,716 A | * | 12/1979 | Harper et al. ............... 47/62 N |
| 4,989,367 A | * | 2/1991 | Chung ............................ 47/61 |
| 5,382,270 A | * | 1/1995 | Graham et al. .............. 47/62 N |
| 5,451,242 A | | 9/1995 | Ming et al. |
| 5,597,731 A | * | 1/1997 | Young et al. ............. 435/284.1 |
| 5,707,418 A | * | 1/1998 | Hsu ............................... 71/32 |
| 5,865,870 A | * | 2/1999 | Hsu ............................... 71/32 |
| 6,295,759 B1 | * | 10/2001 | Malone et al. ............. 47/62 R |
| 6,314,676 B1 | * | 11/2001 | Tucker ....................... 47/62 N |
| 6,541,421 B1 | * | 4/2003 | Forsyth et al. .............. 504/101 |
| 2005/0061045 A1 | * | 3/2005 | Lynch et al. ................... 71/32 |
| 2005/0178178 A1 | * | 8/2005 | Lovatt ........................... 71/31 |

FOREIGN PATENT DOCUMENTS

| | | |
|---|---|---|
| WO | WO 94/08896 | 4/1994 |
| WO | WO 95/26130 | 10/1995 |

OTHER PUBLICATIONS

B. Bugbee and F. Salisbury, "An Evaluation of MES and Amberlite IRC-50 as pH Buffers for Nutrient Solution Studies", Journal of Plant Nutrition, 1985, p. 567-583, vol. 8, issue 7.
J. Frick and C. Mitchell, "Stabilization of pH in Solid-matrix Hydroponic systems", HortScience, 1993, p. 981-984, vol. 28, issue 10.
B. Bugbee, "Nutrient Management in Recirculating Hydroponic Culture", presented at the South Pacific Soil-less Culture Conference, Feb. 11, 2003, Palmerston North, New Zealand.
H.M. Resh, "Hydroponic Food Production," 2001, pp. 34-118, Woodbridge Press Publishing Company, Santa Barbara, CA, USA.
EZHydroKit EZ Grow Guide, www.EzHydroKit.com, 2003, pp. 1-6.
EZHydroKit FAQ's, www.EzHydroKit.com, 2004, pp. 1-6.

* cited by examiner

*Primary Examiner*—Wayne Langel
(74) *Attorney, Agent, or Firm*—Hamilton DeSanctis & Cha, LLP

(57) ABSTRACT

This invention provides pH buffered plant nutrient compositions, methods for fertilizing a plant growing or a seed germinating in a hydroponics system, methods for growing a plant in a hydroponics system, and methods for making a pH buffered plant nutrient composition. The compositions and methods of this invention are useful with distilled water, deionized water, filtered water, and United States municipal tap water. The compositions and methods of this invention are useful with most of the municipal water supplies in the United States. pH buffering agents useful in the practice of this invention include phosphate buffers, aquarium buffers, 2-[N-morpholino]ethanesulfonic acid, and mixtures thereof.

7 Claims, No Drawings

PH BUFFERED PLANT NUTRIENT COMPOSITIONS AND METHODS FOR GROWING PLANTS

CROSS-REFERENCE TO RELATED APPLICATIONS

This application claims priority under 35 U.S.C. 119(e) to provisional patent application No. 60/640,722, filed Dec. 30, 2004, which is hereby incorporated by reference in its entirety to the extent not inconsistent with the disclosure herein.

FIELD OF THE INVENTION

This invention is in the fields of plant agriculture, home gardening, indoor gardening, and hydroponics.

BACKGROUND

It is known in the art that plants generally grow well between pH 4 and 7, when supplied with appropriate amounts of water, nutrients, photoradiation, carbon dioxide, and oxygen. Plants don't grow well outside this pH range because of reduced nutrient availability at high and low pH. Every plant variety has an optimal pH, many of which are known in the art.

Hydroponics, the cultivation of plants without soil, provides healthier, disease-free plants, faster than growing in soil. In soil-less culture, plants are instead cultivated using a liquid solution of water and nutrients. The recommended pH for hydroponic culture is usually between 5.5 to 5.8 because overall availability of nutrients is optimized at a slightly acid pH. The availabilities of manganese (Mn), copper (Cu), zinc (Zn) and especially iron (Fe) are reduced at higher pH, and there is a small decrease in availability of phosphorus (P), potassium (K), calcium (Ca), and magnesium (Mg) at lower pH.

The quality of water used for hydroponics varies widely, because water supplies vary widely. Municipal water supplies vary from each other, and each supply typically varies throughout the year as municipalities change utilization of water sources and as stored water evaporates in dry seasons. In the United States, delivered municipal water is required to be kept above pH 7 to prevent leaching of lead from old plumbing, as occurs when lead contacts acid. Many municipal water supplies are high in alkalinity. Alkalinity is a liquid's ability, or inability, to neutralize acids or hydrogen ions. Most alkalinity in water comes from calcium carbonate ($CaCO_3$) that comes from rocks and soil. Both carbonates and bicarbonates contribute to alkalinity. Water alkalinity is typically measured by the amount of carbonates in the water as parts per million (ppm). Highly alkaline water is more able to neutralize acids. Therefore, high alkalinity water that is above pH 7 requires the addition of more acid to reduce the pH to levels acceptable for hydroponics than low alkalinity water. Of the largest 50 cities in the U.S., about 50% deliver water having alkalinity of over 100 ppm and/or having a pH equal to or higher than pH 8 for at least part of the year. Over 15% of the cities deliver water with a pH equal to or higher than pH 9 and/or with an alkalinity over 200 ppm.

All municipal water supplies in the U.S. would be expected to require addition of acid (to lower pH) before use in a hydroponics system. Many hydroponics nutrient formulas include acids, therefore some municipal water supplies with nutrients require addition of base (to raise pH). The pH of hydroponics systems also changes with time as plants grow and nutrients are used. When water is added to a hydroponics system, if that water contains carbonates, typically the pH is raised and needs to be readjusted. The pH can be measured by a variety of methods known in the art including using pH paper or a pH meter. Typically, the pH of the nutrient solution in a hydroponics system is measured and the pH adjusted before growing begins. Then throughout the growing cycle, the pH is repeatedly measured and adjusted, particularly after adding nutrients or water.

In production hydroponics systems, pH is typically controlled with an automated pH control system that adds acid or base to the nutrient solution. These systems require 3 components: a pH electrode, a pH controller, and a solenoid.

pH buffers are chemicals that when in solution, are resistant to changes in pH. Typically buffers are a combination of a weak acid and its salt or a weak base and its salt. Each chemical buffer has an optimal pH range, where the buffer is most resistant to changes in pH. The optimal pH range is characterized by selected concentrations of the acid or base and its salt. The carbonates causing alkalinity function as buffers and keep the pH high.

pH buffers are used in agriculture and aquaculture for a variety of purposes. AgXplore (Cape Girardeau, Mo., USA) sells a product called Linke, a buffering agent and a compatibility agent that is said to improve the stability of liquid fertilizers when mixed with pesticides and/or micronutrients. Also, many products on the market help stabilize the pH of water in fish aquariums and for building carbonate hardness, typically by using carbonate based buffers. U.S. Pat. No. 5,451,242 and WO 94/08896 describe an active synthetic soil that optionally includes a pH buffer, such as humic acid. The pH of the soil is described to be in a range of pH 5 to pH 7, when the buffer is used from 0 to about 10 parts per 100 parts of zeolite soil mixture.

pH buffers have been described as useful in hydroponics. 95/26130 describes a hydroponic method including a step of adding a pH buffer to the solution. B. Bugbee and F. Salisbury (1985, An evaluation of MES and Amberlite IRC-50 as pH buffers for Nutrient Solution Studies. J. Plant Nutr. 8:567-583) describe use of 2-[N-morpholino]ethanesulfonic acid (MES) at concentrations of 1 and 10 mM as pH buffers for nutrient solution studies for hydroponics. Stabilization of pH in solid-matrix hydroponic systems (HortScience. 1993 28(10):981-4) describes the use of 5 mM and 10 mM MES to stabilize substrate pH of passive-wicking, solid-matrix hydroponic systems. Bruce Bugbee (Nutrient Management in Recirculating Hydroponic Culture, presented at the South Pacific Soil-less Culture Conference, Feb. 11, 2003 in Palmerston North, New Zealand), describes that phosphorous in solution buffers pH, but if phosphorous is maintained at levels that are adequate to stabilize pH (1 to 10 mM), it becomes toxic to plants.

General Hydroponics sells Flora series nutrient products that are said to contain a pH buffer, but the instructions say that adjustment may be necessary since water quality and pH vary both regionally and seasonally.

No products are known to have been described or exist on the market that contain pH buffers and plant nutrients that are useful for stabilizing the pH of a wide range of water supplies without the requirement of additional pH measuring and/or adjustment steps whereby the solution is useful for growing a wide range of plants in a hydroponic system.

SUMMARY OF THE INVENTION

This invention provides pH buffered plant nutrient compositions comprising: at least one plant nutrient ingredient and at least one pH buffering means. In an embodiment, the pH buffered plant nutrient composition comprises a complete set of plant nutrient ingredients. In an embodiment, the pH buffered plant nutrient composition is for growing a plant in a hydroponic system. In an embodiment, the pH buffered plant nutrient composition is for growing a plant selected from the group consisting of: lettuce, tomatoes, herbs, and flowers.

In an embodiment, the pH buffered plant nutrient composition is for buffering the pH of a water solution containing the composition within a pH range selected from the group consisting of between about pH 3.5 and about pH 7.5, between about pH 4 and about pH 7, between about pH 4.2 and about pH 6.8, between about pH 5 and about pH 6.5, between about pH 5.5 and about pH 6.5, and between about pH 5.5 and about pH 5.8.

In an embodiment, the water solution comprises a water selected from the group consisting of: distilled water, deionized water, filtered water, and United States (U.S.) municipal tap water.

In an embodiment, the compositions of this invention are useful with at least about 99%, at least about 95%, at least about 90%, at least about 75%, or at least about 50% of the municipal water supplies in the United States.

In an embodiment, the pH buffering means is a pH buffering agent. In an embodiment, the pH buffering agent comprises a buffer selected from the group consisting of phosphate buffers, aquarium buffers, 2-[N-morpholino] ethanesulfonic acid (MES), and mixtures thereof.

This invention provides methods for fertilizing a plant growing in a hydroponics system comprising an aqueous liquid, the method comprising adding a pH buffered plant nutrient composition comprising at least one plant nutrient ingredient and at least one pH buffering means to the aqueous liquid.

This invention provides methods for growing a plant in a hydroponics system comprising an aqueous liquid, the method comprising adding a pH buffered plant nutrient composition comprising at least one plant nutrient ingredient and at least one pH buffering means to the aqueous liquid before the first and then after every time period selected from the group consisting of: about 1 week, about 2 weeks, about 1 month, while the plant is growing.

In an embodiment, the quality or quantity of the plant growing is about equivalent to or better than an equivalent plant growing in an equivalent hydroponics system, with an equivalent at least one nutrient ingredient, without the composition.

This invention provides methods for making a pH buffered plant nutrient composition comprising: providing at least one plant nutrient ingredient; providing at least one pH buffering means; and combining the at least one plant nutrient ingredient and the pH buffering means.

This invention provides methods for fertilizing a plant growing in a hydroponics system comprising an aqueous liquid, the method comprising simultaneously adding at least one plant nutrient ingredient and at least one pH buffering means.

DETAILED DESCRIPTION OF THE INVENTION

As used in the art and as used herein, "nutrients" refers to atoms and molecules in an available form necessary for plant growth in addition to oxygen, hydrogen, and water including, but not limited to, calcium, magnesium, sodium, potassium, nitrogen, phosphorus, sulfur, chlorine, iron, manganese, copper, zinc, boron, and molybdenum. Nutrient formulations and recipes are known in the art (see, for example, Resh H. M (2001) Hydroponic Food Production, Sixth Addition, Woodbridge Press Publishing Company, Santa Barbara, Calif., USA). As used in the art and as used herein, "grow" and "bloom" nutrients are complete sets of nutrients for vegetative and blooming/fruiting stages of plant development. Bloom nutrients are also useful for plants growing better with more nitrogen, magnesium, sulfate, and calcium, such as herbs, particularly basil.

It is known in the art that a liquid that contacts a plant, e.g., liquid used to supply nutrients to a plant, is preferably within a particular pH range. Optimal pH ranges for a variety of plants are known in the art. Preferably the compositions and methods of this invention maintain the pH of liquids within the optimal pH ranges.

As used herein, "photoradiation" refers to wavelengths of light of sufficient quantity and quality that allow a plant to grow, as is known in the art. It is known in the art which quantities and wavelengths of photoradiation are preferred for many plants.

As used herein, "pH buffering agent" refers to a chemical that when dissolved in water, resists changes to pH upon addition of acid or base, compared to water without the pH buffering agent added upon addition of the same amounts of the same acids and bases.

As used herein, "water" refers to compositions comprising $H_2O$, including pure water and impure water. As used herein, "distilled water" refers to water that has been distilled, "deionized water" refers to water that has been deionized as is known in the art, "filtered water" refers to water that has been filtered to remove or reduce a component, and "United States municipal tap water" refers to water supplied by a municipality in the United States. As used herein, "aqueous solutions" include water and water with nutrients or compositions of this invention. As used herein, "well water" is water from a well that has not been subsequently filtered, "softened water" refers to water to which softening agents have been added and not subsequently filtered, and "spring water" refers to water that may have been subsequently bottled but originates from a natural spring and has not been subsequently filtered.

This invention provides a pH buffered plant nutrient composition comprising: at least one plant nutrient ingredient and at least one pH buffering means. In an embodiment, the pH buffered plant nutrient composition comprises a complete set of plant nutrient ingredients. In an embodiment, the pH buffered plant nutrient composition is useful for growing a plant in a hydroponic system with or without any additional nutrient composition.

In an embodiment, the pH buffered plant nutrient composition is useful for buffering the pH of a water solution containing said composition within a pH range selected from the group consisting of between about pH 3.5 and about pH 7.5, between about pH 4 and about pH 7, between about pH 4.2 and about pH 6.8, between about pH 5 and about pH 6.5, between about pH 5.5 and about pH 6.5, and between about pH 5.5 and about pH 5.8. In an embodiment, the water solution comprises a water selected from the group consisting of: distilled water, deionized water, filtered water, and United States (U.S.) municipal tap water. In an embodiment, the water solution comprises a water selected from the group consisting of: well water, spring water, and softened water.

In an embodiment, the pH buffering means is a pH buffering agent. In an embodiment, the pH buffering agent comprises a buffer selected from the group consisting of phosphate buffers, aquarium buffers, 2-[N-morpholino] ethanesulfonic acid (MES), and mixtures thereof. In an embodiment, the pH buffering agent comprises a sodium phosphate buffer or a potassium phosphate buffer. In an embodiment, the pH buffering agent comprises monopotassium phosphate and/or dipotassium phosphate.

In an embodiment, the pH buffered plant nutrient composition is useful for delivering to a liquid, an amount of monopotassium phosphate per liter of liquid, said amount selected from the group consisting of: between about 0.1 grams to about 1 g, between about 0.2 g to about 0.8 g, between about 0.3 g to about 0.6 g, and about 0.45 g.

In an embodiment, the pH buffered plant nutrient composition comprises a percentage by weight of monopotassium phosphate, said percentage selected from the group consisting of between about 20% and about 90%, between about 30% and about 80%, between about 40% and about 70%, more than about 30%, more than about 45%, more than about 70%, more than about 90%, less than about 55%, less than about 30%, and about 50%.

In an embodiment, the pH buffered plant nutrient composition is in a form selected from the group consisting of: liquid, gel, solid powder, tablet, pellet, and granule. In an embodiment, the pH buffered plant nutrient composition comprises sufficient nutrient and pH buffering means for growing a plant and buffering pH during said growing for a time period selected from the group consisting of: between about 1 day and about 1 month, between about 1 week and about 3 weeks, about 2 weeks.

This invention provides a method for growing a plant or germinating a seed in a hydroponics system containing an aqueous liquid, said method comprising adding a pH buffered plant nutrient composition of this invention, such as comprising: at least one plant nutrient ingredient and at least one pH buffering means; to said aqueous liquid before the first and then after every time period selected from the group consisting of: about 1 week, about 2 weeks, about 1 month. In an embodiment, the quality or quantity of said plant growing is about equivalent to or better than an equivalent plant growing in an equivalent hydroponics system, with an equivalent at least one nutrient ingredient, without said composition. In an embodiment, the method does not comprise a pH measuring step or a pH adjusting step, or both. In an embodiment, the method does not comprise a flush of the aqueous liquid while said plant is growing.

This invention provides a method for fertilizing a plant or seed comprising adding a pH buffered plant nutrient composition comprising a plant nutrient composition of this invention: at least one plant nutrient ingredient and at least one pH buffering means, to an aqueous liquid and delivering said aqueous liquid to said plant or seed. In an embodiment, the aqueous liquid is contained within a hydroponics system before said pH buffered plant nutrient composition is added or wherein said aqueous like is delivered to a hydroponics system after said pH buffered plant nutrient composition is added.

This invention provides pH buffered plant nutrient compositions comprising: at least one plant nutrient ingredient and at least one pH buffering means. In an embodiment, the pH buffered plant nutrient composition comprises a complete set of plant nutrient ingredients. In an embodiment, the plant nutrient ingredient is calcium nitrate or magnesium sulfate. In an embodiment, the pH buffered plant nutrient composition is for growing a plant in a hydroponic system. In an embodiment, the pH buffered plant nutrient composition comprises grow plant nutrients for growing vegetative tissue or bloom plant nutrients for growing flower, vegetable and/or fruit tissue.

In an embodiment, the pH buffered plant nutrient composition is for buffering the pH of a water solution containing the composition within a pH range selected from the group consisting of between about pH 3.5 and about pH 7.5, between about pH 4 and about pH 7, between about pH 4.2 and about pH 6.8, between about pH 5 and about pH 6.5, between about pH 5.5 and about pH 6.5, and between about pH 5.5 and about pH 5.8.

In an embodiment, the water solution comprises a water selected from the group consisting of: distilled water, deionized water, filtered water, and United States (U.S.) municipal tap water. In an embodiment, the water solution comprises a water selected from the group consisting of: well water, spring water, and softened water.

In an embodiment, the water solution is a U.S. municipal tap water from a percentage selected from the group consisting of: at least about 99%, at least about 95%, at least about 90%, at least about 75%, and at least about 50%, of the municipal tap water supplies in the U.S. In an embodiment, the compositions of this invention are useful with at least about 99%, at least about 95%, at least about 90%, at least about 75%, or at least about 50% of the municipal water supplies in the United States.

In an embodiment, the pH buffering means is a pH buffering agent. In an embodiment, the pH buffering agent comprises a buffer selected from the group consisting of phosphate buffers, aquarium buffers, 2-[N-morpholino] ethanesulfonic acid (MES), and mixtures thereof.

In an embodiment, the pH buffering agent comprises a sodium phosphate buffer or a potassium phosphate buffer. In an embodiment, the phosphate buffer is an aquarium buffer. In an embodiment, the pH buffering agent comprises monopotassium phosphate. In an embodiment, the pH buffered plant nutrient composition is for delivering an amount selected from the group consisting of: between about 0.1 grams to about 1 g, between about 0.3 g to about 0.8 g, between about 0.5 g to about 0.6 g, and about 0.55 g of monopotassium phosphate per liter of liquid. In an embodiment, the pH buffered plant nutrient composition comprises between about 1 g and about 3 g or about 2 g of monopotassium phosphate. In an embodiment, the pH buffered plant nutrient composition comprises a percentage selected from the group consisting of between about 30% and about 90%, between about 40% and about 80%, between about 50% and about 70%, more than about 30%, more than about 50%, more than about 70%, more than about 90%, and less than about 30% by weight monopotassium phosphate.

In an embodiment, the pH buffered plant nutrient composition further comprises dipotassium phosphate. In an embodiment, the pH buffered plant nutrient composition is for delivering an amount selected from the group consisting of: between about 0.1 milligrams to about 100 mg, between about 1 mg to about 50 mg, and between about 10 mg to about 30 mg of dipotassium phosphate per liter of liquid. In an embodiment, the pH buffered plant nutrient composition comprises between about 20 mg and about 100 mg or about 0.3 g of dipotassium phosphate. In an embodiment, the pH buffered plant nutrient composition comprises a percentage selected from the group consisting of between about 0.1% and about 15%, between about 0.6% and about 12%, between about 3% and about 10%, more than about 0.1%, more than about 0.6%, more than about 1%, more than about 10%, and less than about 0.1%, by weight dipotassium phosphate.

In an embodiment, the pH buffering agent comprises aquarium buffer Kent® pH Precise™ 6.0 Low Range Controller™, pH 5.0 Discus Buffer™, or mixtures thereof. In an embodiment, the pH buffered plant nutrient composition is for delivering an amount selected from the group consisting of: between about 0.4 grams to about 1 g, between about 0.6 g to about 0.8 g, and about 0.7 g of aquarium buffer per liter of liquid. In an embodiment, the pH buffered plant nutrient composition comprises between about 2 g and about 3 g or about 2.6 g of aquarium buffer. In an embodiment, the pH buffered plant nutrient composition comprises a percentage selected from the group consisting of between about 30% and about 90%, between about 40% and about 80%, between about 50% and about 70%, more than about 30%, more than about 50%, more than about 70%, more than about 90%, and less than about 30% by weight aquarium buffer. In an embodiment, the pH buffered plant nutrient composition comprises a percentage selected from the group consisting of between about 0.1% and about 15%, between about 0.6% and about 12%, between about 3% and about 10%, more than about 0.1%, more than about 0.6%, more than about 1%, more than about 10%, and less than about 0.1%, by weight aquarium buffer.

In an embodiment, the pH buffering agent comprises MES. In an embodiment, the pH buffered plant nutrient composition is for delivering an amount selected from the group consisting of: between about 0.1 grams to about 2 g, between about 0.5 g to about 1.5 g, less than about 0.2 g, and about 1 g of MES per liter of liquid. In an embodiment, the pH buffered plant nutrient composition comprises between about 2 g and about 3 g or about 2.6 g of MES. In an embodiment, the pH buffered plant nutrient composition comprises a percentage selected from the group consisting of between about 30% and about 90%, between about 40% and about 80%, between about 55% and about 70%, more than about 30%, more than about 50%, more than about 70%, more than about 90%, and less than about 30% by weight MES.

In an embodiment, the composition is in a form selected from the group consisting of: liquid, gel, solid powder, tablet, pellet, and granule.

In an embodiment, the pH buffered plant nutrient composition is for growing a plant selected from the group consisting of: lettuce, tomatoes, herbs, and flowers.

In an embodiment, the pH buffered plant nutrient composition comprises sufficient nutrient and pH buffering means for growing a plant and buffering pH during the growing for a time period selected from the group consisting of: between about 1 day and about 1 month, between about 1 week and about 3 weeks, and about 2 weeks.

This invention provides methods for fertilizing a plant growing in a hydroponics system comprising an aqueous liquid, the method comprising adding a pH buffered plant nutrient composition comprising at least one plant nutrient ingredient and at least one pH buffering means to the aqueous liquid.

This invention provides methods for growing a plant in a hydroponics system comprising an aqueous liquid, the method comprising adding a pH buffered plant nutrient composition comprising at least one plant nutrient ingredient and at least one pH buffering means to the aqueous liquid before the first time and then after every time period selected from the group consisting of: about 1 week of time, about 2 weeks, and about 1 month, while the plant is growing.

In an embodiment, the method does not comprise a pH measuring step or a pH adjusting step, or both. In an embodiment, the method also comprises adding water to the hydroponics system. In an embodiment, the method does not comprise a flush of the aqueous liquid while the plant is growing.

In an embodiment, the quality or quantity of the plant growing is about equivalent to or better than an equivalent plant growing in an equivalent hydroponics system, with at least one equivalent nutrient ingredient, without the composition.

This invention provides methods for making a pH buffered plant nutrient composition comprising: providing at least one plant nutrient ingredient; providing at least one pH buffering means; and combining the at least one plant nutrient ingredient and the pH buffering means.

This invention provides methods for fertilizing a plant growing in a hydroponics system comprising an aqueous liquid, the method comprising simultaneously adding at least one plant nutrient ingredient and at least one pH buffering means.

All waters that remain between a pH of 4 and 7 using the compositions of this invention, and do not otherwise contain any chemicals that in the amounts used in the methods of this invention are toxic to plants, are useful in the practice of this invention. Preferred waters include distilled water, deionized water, filtered water, and municipal tap water. Filters useful in the practice of this invention include Brita filters (Brita International, Oakland, Calif. USA).

This invention provides a set of pH buffered plant nutrient compositions useful for providing all the nutrients required for the lifetime of a plant.

In an embodiment, the pH buffered plant nutrient compositions of this invention are formulated or provided as liquid, gel, powder, in capsules, tablets, pellets, and/or granules, using methods known in the art. All capsules known in the art are useful in the practice of this invention, however vegetarian capsules are preferred.

The compositions of this invention contain active ingredients including plant nutrients and pH buffering means and agents. In an embodiment, the plant nutrient and the pH buffering means is packaged with other active ingredients.

In an embodiment, the pH buffering means in the compositions of this invention, when dissolved in a hydroponics system, are at a sufficiently low concentration to not be substantially toxic to a plant grown in the system.

In an embodiment, the phosphate buffer is chemical grade (Sigma Aldrich P3786, P0662), food grade (Astaris, Carteret, N.J. USA), or agricultural grade or a mixture thereof.

In an embodiment, the MES is 2-[N-Morpholino]ethanesulfonic acid Hydrate (Sigma Aldrich M-8250).

In an embodiment, plant growth in hydroponics using municipal tap water and a composition of this invention is about the same or better quantity and quality as when grown in an equivalent hydroponic apparatus using distilled water and about equivalent nutrients while the solution is maintained at pH 5.7.

In an embodiment, the plant nutrient is in a form available to the plants.

In an embodiment, the plant nutrients are in an available form in the proportions listed in Table 1.

TABLE 1

| Atom | Percent |
| --- | --- |
| nitrogen | 10 |
| phosphorus | 8 |
| potassium | 22 |
| calcium | 5 |
| iron | 0.2 |
| manganese | 0.1 |
| zinc | 0.01 |
| copper | 0.01 |
| boron | 0.02 |
| molybdenum | 0.005 |

Ingredients useful for making plant nutrients are known in the art and include, but are not limited to: Boric Acid, Calcium Chloride, Calcium Nitrate, Di-Ammonium Phosphate, Magnesium Sulfate, Mono-Ammonium Phosphate, Mono-Potassium Phosphate, Potassium Chloride, Potassium Sulfate, Copper Sulfate, Iron Sulfate, Manganese Sulfate, Zinc Sulfate, Magnesium Sulfate, Calcium Nitrate, Calcium Chelate, Copper Chelate, Iron Chelate, Iron Chelate, Manganese Chelate, Zinc Chelate, and Ammonium Molybdate.

In an embodiment, the at least one plant nutrient is a complete set of nutrients such as Hobby Formula (Hydro-Gardens, Colorado Springs, Colo. USA). In an embodiment, for a grow nutrient, 2.34 g Hobby are added per gallon of water for use in a hydroponics system. In an embodiment for a bloom nutrient, 2.34 g Hobby is added, 0.75 g of Calcium Nitrate, and 1 g of Magnesium Sulfate are added per gallon of water. These grow and bloom formulas are for two weeks of growth.

In an embodiment, the plant nutrient is calcium nitrate. In an embodiment, the plant nutrient is magnesium sulfate, in a form that is about 9.9% magnesium. A composition containing all the items listed in Table 1 is an example of a complete set of plant nutrients.

All hydroponics systems known to the art or as yet to be invented are useful in the practice of this invention. The compositions and methods of this invention are useful in an enclosed hydroponics system.

In an embodiment, the pH buffered plant nutrient composition is packaged for a selected hydroponics system for growing a selected plant variety, whereby the precise amount of active ingredients is included for a selected time period when growing the selected variety in the selected hydroponics system, thereby requiring addition of only one package or one set of packages per time period. Active ingredients can include plant nutrients and pH buffering agents. For example, one package with grow nutrients suitable for seedlings of most crops or low nutrient-requiring plants grown only for vegetative tissue such as lettuce, could include plant nutrients and pH buffering agents sufficient for two weeks of growth. As another example, one set of packages for bloom nutrients suitable for herbs and flowering tomatoes, could include, in a first package, plant nutrients and pH buffering agents, and in a second package, calcium nitrate, and in a third package, magnesium sulfate, together suitable for two weeks of growth. The pH buffering agent can be combined with one or more or the plant nutrients, calcium nitrate, or magnesium sulfate.

In an embodiment, the compositions of this invention are useful for growing lettuces, tomatoes, herbs, and flowers.

The compositions of this invention can be packaged as known in the art. The pH buffering plant nutrient compositions of this invention are manufactured using convenient and economical production methods and packaged in convenient and economical packaging.

The compositions and methods of this invention are useful for growing plants from seed through maturity.

The embodiments of this invention are useful with both the compositions and methods of this invention.

Appropriate nutrient formulations and concentrations for selected plants and plant developmental stages are known in the art.

All buffers known in the art that maintain the pH in a range suitable for growing plants and not agrotoxic are useful in the practice of this invention.

Example 1

Lettuce, tomatoes, flowers (petunias) and herbs (basil, cilantro, parsley, dill, sage) are grown in a 1 gallon circulating hydroponics system using compositions of this invention. The plants are fertilized as follows in Table 2.

TABLE 2

| Plant | Week 0 | Week 2 | Week 3 | Week 4, etc. |
| --- | --- | --- | --- | --- |
| Lettuce | 2.34 g Hobby | 1.17 g Hobby | 1.17 g Hobby | 1.17 g Hobby |
|  | 3.7 g MES | 3 g MES | 3 g MES | 3 g MES |
| Tomatoes | 2.34 g Hobby | 1.17 g Hobby | 1.17 g Hobby | 1.17 g Hobby |
| Flowers | 3.7 g MES | 1 g Mag Sulf | 1 g Mag Sulf | 1 g Mag Sulf |
| Herbs |  | 0.75 g Cal Nit | 0.75 g Cal Nit | 0.75 g Cal Nit |
|  |  | 3 g MES | 3 g MES | 3 g MES |

The plants are grown in distilled water and in municipal tap water having a starting pH of 8.5 and an alkalinity of 200 ppm. The pH of the distilled water systems never drops below pH 4, and the pH of the municipal tap water systems never rises above pH 6.8. Water is added as required by the system. The hydroponics systems are never flushed. Control plants grown in the municipal tap water having a starting pH of 8.5 and an alkalinity of 200 ppm, that are given the same nutrients without the buffering agent are very unhealthy.

Example 2

Lettuce, tomatoes, flowers (petunias) and herbs (basil, cilantro, parsley, dill, sage) are grown in a 1 gallon circulating hydroponics system using compositions of this invention. The plants are fertilized as follows in Table 3.

TABLE 3

| Plant | Week 0 | Week 2 | Week 3 | Week 4, etc. |
| --- | --- | --- | --- | --- |
| Lettuce | 2.34 g Hobby | 1.17 g Hobby | 1.17 g Hobby | 1.17 g Hobby |
|  | and | and | and | and |
|  | 2.65 g Kent | 2.15 g Kent | 2.15 g Kent | 2.15 g Kent |
|  | or | or | or | or |
|  | 2.65 Discus | 2.15 Discus | 2.15 Discus | 2.15 Discus |
|  | or | or | or | or |

TABLE 3-continued

| Plant | Week 0 | Week 2 | Week 3 | Week 4, etc. |
|---|---|---|---|---|
| Tomatoes Flowers Herbs | 2 g monoKphos or 2 g monoKphos and 30 mg diKphos 2.34 g Hobby and 2.65 g Kent or 2.65 Discus or 2 g monoKphos or 2 g monoKphos and 30 mg diKphos | 1.6 g monoKphos or 1.6 g monoKphos and 24 mg diKphos 1.17 g Hobby 1 g Mag Sulf 0.75 g Cal Nit and 2.15 g Kent or 2.15 Discus or 1.6 g monoKphos or 1.6 g monoKphos and 24 mg diKphos | 1.6 g monoKphos or 1.6 g monoKphos and 24 mg diKphos 1.17 g Hobby 1 g Mag Sulf 0.75 g Cal Nit and 2.15 g Kent or 2.15 Discus or 1.6 g monoKphos or 1.6 g monoKphos and 24 mg diKphos | 1.6 g monoKphos or 1.6 g monoKphos and 24 mg diKphos 1.17 g Hobby 1 g Mag Sulf 0.75 g Cal Nit and 2.15 g Kent or 2.15 Discus or 1.6 g monoKphos or 1.6 g monoKphos and 24 mg diKphos |

The plants are grown in distilled water and in municipal tap water having a starting pH of 8.5 and an alkalinity of 200 ppm. The pH of the distilled water systems never drops below pH 4, and the pH of the municipal tap water systems never rises above pH 6.8. Water is added as required by the system. The hydroponics systems are flushed every month. Control plants grown in the municipal tap water having a starting pH of 8.5 and an alkalinity of 200 ppm, that are given the same nutrients without the buffering agent are very unhealthy.

Example 3

Three compositions of this invention are made, the first containing 1.15 g of Hobby plant nutrients, the second containing 1 g of magnesium sulfate, and the third containing 0.75 calcium nitrate. In a hydroponics system, two of the Hobby plant nutrient compositions of this invention, are added to the water for germination. For lettuce, after two weeks, one of the Hobby compositions is added per gallon of water. For herbs, tomatoes, and flowers, one of the Hobby compositions, one of the calcium nitrate compositions, and one of the magnesium sulfate compositions are added every week. Each total dose contains a total grams of buffering agent per gallon as listed in Table 4. MES, Kent, Discus, and monopotassium phosphate can be used alone. Monopotassium phosphate can be used in combination with dipotassium phosphate. Buffering agents can be combined proportionately.

TABLE 4

| Buffer | Buffer Conc. g/L | Buffer Conc. g/gal | Fraction Buffer Ingredient vs. Nutrient | | |
|---|---|---|---|---|---|
| | | | 2.34 g Hobby | 1 g MagSulf | 0.75 g CalNit |
| MES 5 mMol | 0.9760 | 3.6940 | 0.6122 | 0.7870 | 0.8312 |
| Kent 4X | 0.7000 | 2.6500 | 0.5311 | 0.7260 | 0.7794 |
| Discus 4X | 0.7000 | 2.6500 | 0.5311 | 0.7260 | 0.7794 |
| MonoPot Phos 4 mMol | 0.5440 | 2.0600 | 0.4682 | 0.6732 | 0.7331 |
| DiPot Phos 0.134 mMol | 0.0233 | 0.0880 | 0.0362 | 0.0809 | 0.1050 |
| DiPot Phos 0.0447 mM | 0.0078 | 0.0293 | 0.0124 | 0.0285 | 0.0376 |
| DiPot Phos 0.0223 mM | 0.0039 | 0.0147 | 0.0062 | 0.0145 | 0.0192 |

Example 4

The compositions of this invention are made by weighing out appropriate weight ratios of plant nutrients and buffering agents. The plant nutrients and buffering agents are mixed thoroughly. Aliquots of the mixture are then weighed out (or scooped in premeasured volumes) for single doses and placed in bags. One bag, or one set of bags, is useful for each feeding.

Example 5

Lettuce varieties, tomatoes, flowers (petunias) and herbs (Italian basil, purple basil, cilantro, dill, mint, chives, and oregano) are grown in a 14.5 cup circulating hydroponics system using compositions of this invention. The plants are fertilized as follows in Table 5. Mono is monopotassium phosphate (Hydro-Gardens).

TABLE 5

| Plant | Week 0 | Week 2 | Week 4 | Week 6, etc. |
|---|---|---|---|---|
| Lettuces | 1.5 g Hobby 1.5 g Mono | 1.5 g Hobby 1.5 g Mono | 1.5 g Hobby 1.5 g Mono | 1.5 g Hobby 1.5 g Mono |
| Flowers Herbs | 1.5 g Hobby 1.5 g Mono | 1.5 g Hobby 1.5 g Mono | 3 g Hobby 1.5 g Mono | 3 g Hobby 1.5 g Mono |
| Tomatoes | 1.5 g Hobby 1.5 g Mono | 3 g Hobby 1.5 g Mono | 3 g Hobby 1.5 g Mono | 3 g Hobby 1.5 g Mono |

The plants are grown in tap water from Phoenix, Ariz., and the pH of the water with the pH buffered plant nutrient composition never rises above pH 6.8. Water is added as required by the system. The hydroponics systems are never flushed.

Although this invention has been described with respect to specific embodiments, it is not intended to be limited thereto, and various modifications which will become apparent to the person of ordinary skill in the art are intended to fall within the scope of the invention as described herein. The embodiments of this invention are useful individually and in combination.

All references cited are incorporated herein by reference to the extent that they are not inconsistent with the disclosure herein.

The invention claimed is:

1. A method of growing a plant variety for an entire season, including germination from seed, in a hydroponic system adapted to contain a volume of aqueous liquid, said method comprising:
   a) providing a seed or plant;
   b) providing a hydroponic system;
   c) placing said seed or plant in said hydroponic system;
   d) providing a volume of aqueous liquid comprising a water selected from the group consisting of distilled water, deionized water, filtered water, and United States municipal tap water;
   e) providing a set of dosed pH buffered plant nutrient compositions, each dose comprising a complete set of plant nutrient ingredients and between about 0.2 grams and about 0.6 grams of monopotassium phosphate per each liter of said aqueous liquid, wherein said dose maintains said aqueous liquid at a pH of between about 5 and about 7 for about two weeks, wherein said dose comprises an amount of said complete set of plant nutrient ingredients for about two weeks;
   f) combining said volume of aqueous liquid and said dose in said hydroponic system;
   g) using said hydroponic system to deliver the combined aqueous liquid and dose to the plant or seed; and
   h) repeating steps (e) and (f) about every two weeks.

2. The method of claim 1 wherein a pH measuring step or a Ph adjusting step, or both, is not required during said entire season.

3. The method of claim 1 wherein a flush of said aqueous liquid is not required during said entire season.

4. A kit for growing a plant variety for an entire season in a hydroponic system adapted to contain a volume of aqueous liquid, said kit comprising said hydroponic system and a set of dosed pH buffered plant nutrient compositions, each dose comprising a complete set of plant nutrient ingredients and between about 0.2 grams and about 0.6 grams monopotassium phosphate per each liter of said aqueous liquid; wherein when said dose is used in an aqueous state, said dose maintains a pH of between about 5 and about 7 for about two weeks; wherein said dose comprises an amount of said complete set of plant nutrient ingredients for growing said plant variety in said system for about two weeks; wherein said aqueous liquid comprises a water selected from the group consisting of distilled water, deionized water, filtered water, and United States municipal tap water; and wherein said entire season comprises seed germination.

5. A hydroponic growing kit comprising the kit of claim 4 and a seed of said plant variety.

6. The kit of claim 4 wherein said volume of aqueous liquid is about 3.4 liters and said dose comprises equal to or less than about 1.5 grams monopotassium phosphate.

7. A kit for growing a plant variety for an entire season in a hydroponic system adapted to contain a volume of aqueous liquid, said kit comprising said hydroponic system and a set of dosed pH buffered plant nutrient compositions, each dose comprising a complete set of plant nutrient ingredients and an amount of monopotassium phosphate per each liter of said aqueous liquid selected from the group consisting of between about 0.1 grams and about 1 gram, between about 0.2 grams and about 0.8 grams, between about 0.3 grams and about 0.6 grams, and about 0.45 grams; wherein when said dose is used in an aqueous state, said dose maintains a pH of between about 5 and about 7 for about two weeks: wherein said dose comprises an amount of said complete set of plant nutrient ingredients for growing said plant variety in said system for about two weeks; wherein said aqueous liquid comprises a water selected from the group consisting of distilled water, deionized water, filtered water, and United States municipal tap water; and wherein said entire season comprises seed germination.

* * * * *